No. 619,427. Patented Feb. 14, 1899.
J. F. MILLER.
FLOAT VALVE OR BALL COCK.
(Application filed Feb. 9, 1898.)
(No Model.) 2 Sheets—Sheet 1.
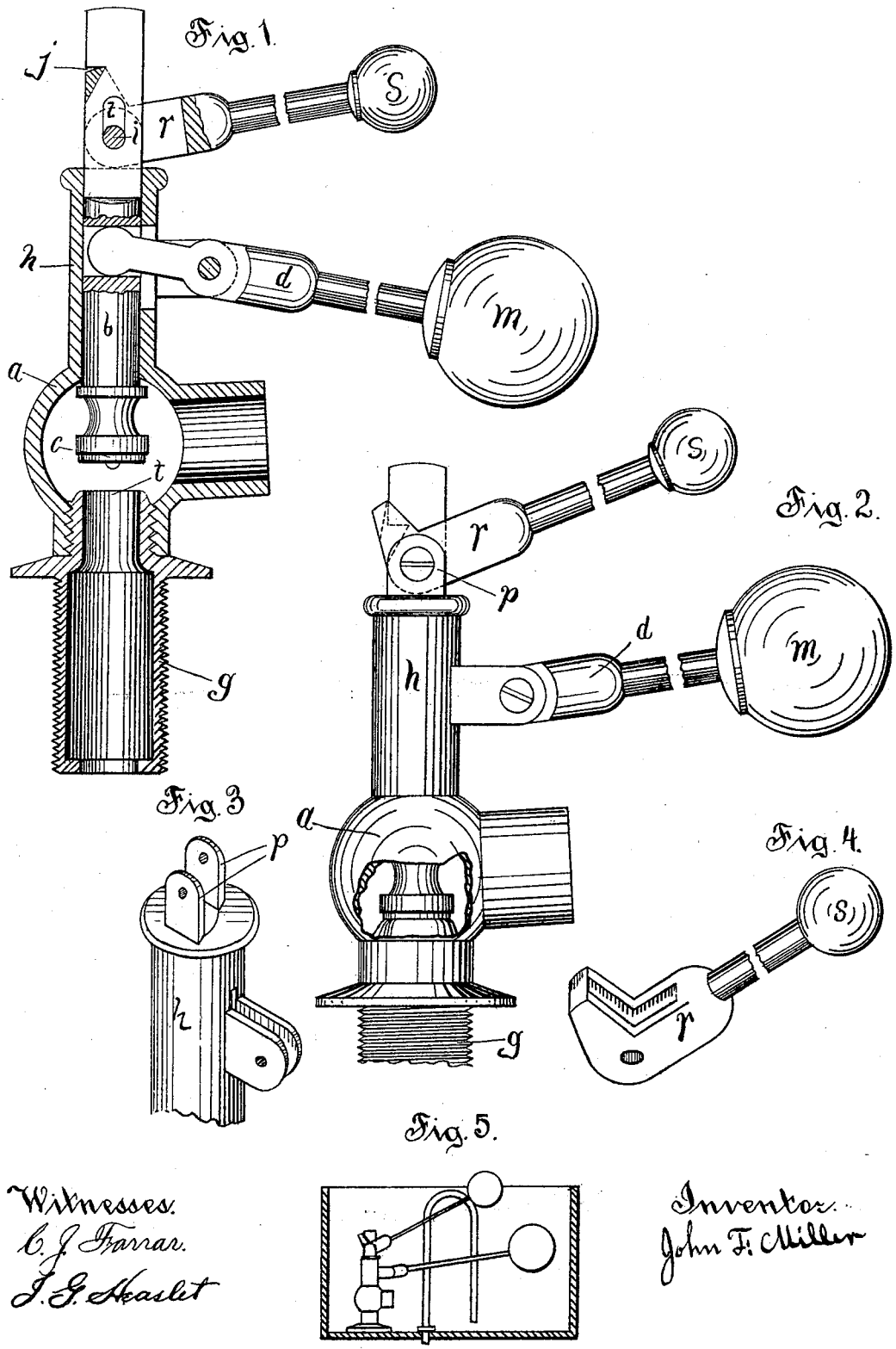
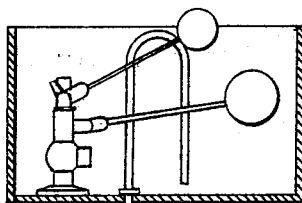

No. 619,427. Patented Feb. 14, 1899.
J. F. MILLER.
FLOAT VALVE OR BALL COCK.
(Application filed Feb. 9, 1898.)
(No Model.) 2 Sheets—Sheet 2.
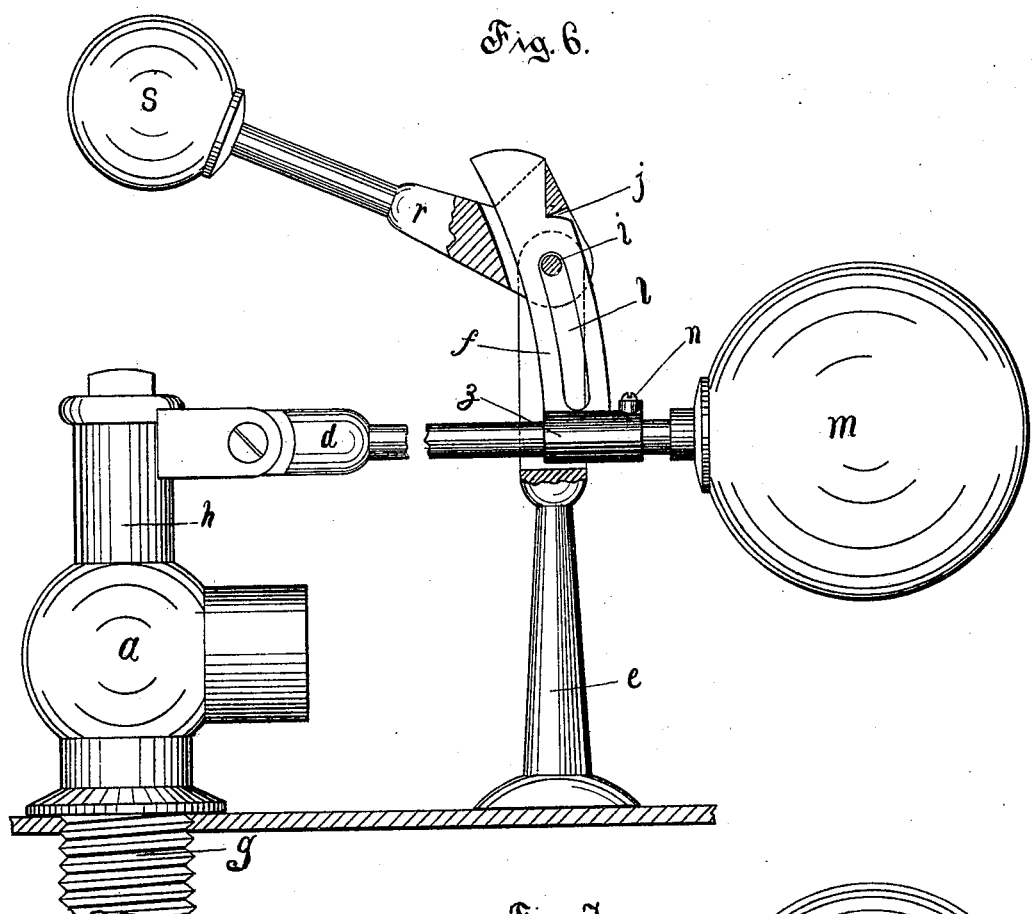
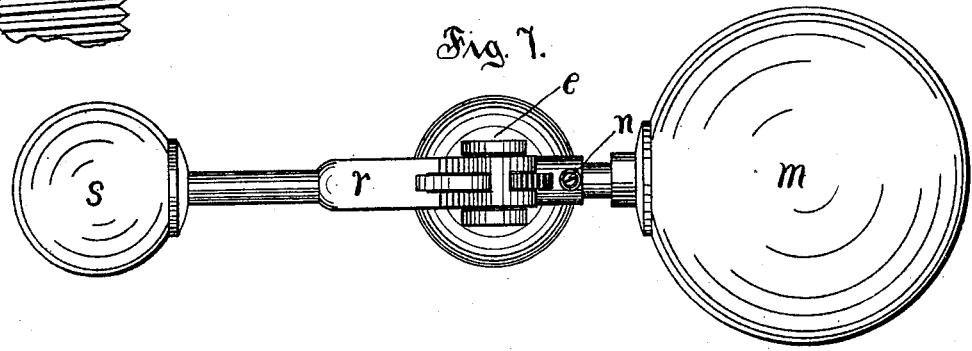
Witnesses.
C. J. Farrar.
J. G. Haslet.
Inventor.
John F. Miller

UNITED STATES PATENT OFFICE.

JOHN F. MILLER, OF ALLEGHENY, PENNSYLVANIA, ASSIGNOR OF ONE-THIRD TO MASTERS SCOTT, OF SAME PLACE.

FLOAT-VALVE OR BALL-COCK.

SPECIFICATION forming part of Letters Patent No. 619,427, dated February 14, 1899.

Application filed February 9, 1898. Serial No. 669,718. (No model.)

*To all whom it may concern:*

Be it known that I, JOHN F. MILLER, of Allegheny, State of Pennsylvania, have invented certain new and useful Improvements in Float-Valves or "Ball-Cocks," as they are commonly called; and I do hereby declare that the following is a full, clear, and exact description of the invention, which will enable others skilled in the art to which it appertains to make and use the same, reference being had to the accompanying drawings, which form a part of this specification.

These valves are used for the purpose of supplying flushing-tanks for water-closets and other purposes.

My invention relates to float-valves, and has for its object the provision of a novel construction for the immediate and noiseless closing of the valve, the rapid filling of the tank, the preservation of the valve-seat, and a reduction in the size of the float-balls.

The customary operation of these valves is automatic by means of a pivoted lever and float-ball, and as the water recedes in the tank the float-ball drops and opens the valve, and when the flushing-valve is closed the water rises in the tank and gradually closes the valve, and at the completion the water is forced out between the disk and seat until the water-pressure is overcome, causing hissing and whistling sounds that may continue many minutes, and any sand or grit that may be in the water will destroy the seat and render the valve useless in a short time.

My invention consists in the novel construction, combination, and arrangement of parts hereinafter described and claimed.

Referring to the accompanying drawings, on Sheet 1 Figure 1 is a vertical section of a float-valve with my improvement in position when the valve is open, and Fig. 2 is a side view of the same with my improvement in position when the valve is closed. Fig. 3 is a perspective view of the upper part of the valve-casing. Fig. 4 is a perspective view of my additional float ball and lever detached and is smaller in dimension than the lower float that moves the valve. Fig. 5 is an outline of a flushing-tank, flushing-valve, and float-valve in position. Fig. 6 is a side elevation, partly in section, of a modified form of my invention; and Fig. 7 is a top plan view thereof.

The letter $a$ designates the valve-chamber; $h$, the neck; $c$, the valve-disk; $b$, the stem, the upper portion of which I prefer to flatten; $m$, the large float-ball; $d$, the lever; $s$, my additional float-ball, and $r$ the lever; $t$, the throttle; $g$, the shank that passes through the tank for the purpose of connecting the water-pipe. $p$ $p$ designate two lugs formed on the upper end of the neck $h$, as shown in Fig. 3. Lugs $p$ $p$ are placed one on each side of the hole that stem $b$ slides in.

The angular end of lever $r$ pivots between the lugs $p$ $p$ and is provided with a mortise for the purpose of allowing the flat end of stem $b$ to pass freely through. The oblong hole $l$ in stem $b$ is for the purpose of allowing its sliding motion on bolt $i$ that lever $r$ pivots on, as I prefer to pass a single bolt clear through lugs $p$ $p$. Stem $b$ is provided with a ratchet. Notch $j$, the upper end of lever $r$ is V shape for the purpose of engaging notch $j$ in stem $b$ and holding the valve on upper stroke and allowing the free admission of the water to the tank and preventing float $m$ from rising until the water fills the tank and carries float $s$ to the desired height. Then the V end of lever $r$ disengages notch $j$ in stem $b$ and float $m$ is free to rise and close the valve at once.

My improvement enables me to so arrange the fulcrum of lever $d$ that the valve will be closed before float $m$ reaches the surface of the water, and therefore I will gain the full buoyance of the ball upon the valve and will be able to use a float-ball almost one-half smaller in dimension than the balls that are required in the old way—namely, floating on the surface of the water.

Fig. 6 on Sheet 2 is an elevation of my invention attached to lever $d$. This application enables me to apply my invention to valves that are in use and make them quick closing. Fig. 7 is a plan of the same. To accomplish this, I place a post $e$ immediately under lever $d$. The top end of this post is split and lever $d$ swings between at the top of fork. Lever $r$ pivots between. I place a segment $f$ on lever $d$, provided with a boss and set-screw to hold it in position. This segment passes through the mortise in the end of lever *r* and is provided with a notch *j*, that engages the end of lever *r*. The oblong opening *l* in segment *f* allows it to slide on bolt *i* that lever *r* pivots on.

Operation, referring to Sheet 2: When the flushing-valve is opened, lever *d* and float *m* drop. As the water in the tank recedes the rear end of lever *d* throws the valve open and admits the water to the tank. Lever *r* and float *s* remain up as the V end of lever *r* will rest upon the plain edge of the sliding segment *f* until the V engages notch *j* in segment *f*. Then float *s* and lever *r* drop by gravitation and prevent lever *d* and float *m* from rising. When the flushing-valve is closed and the tank refills, the water carries float *s* to the desired height. Then the V end of lever *r* disengages the notch *j* in segment *f* and float *m* and lever *d* will be free to rise at once and immediately close the valve.

Having described my invention, I claim—

1. In combination, a supply-pipe, a valve, a float-lever operating said valve, a notched projection upon one of them, and a lever pivoted higher than the valve and carrying a small float on one end and a foot or cam formed upon the other end to engage the notched projection for the purpose described.

2. In combination with a supply-pipe, of a plunger mounted therein carrying a valve at its lower end and a notch at its upper projecting end, a lever fulcrumed in a portion of the pipe and movably connected to the plunger and carrying a float on its outer end, and a small lever fulcrumed upon the top of the pipe carrying a small float on one end and a cam on the other end adapted to be engaged by the notch of the plunger, substantially as described.

3. In combination with a pipe having an entrance and exit openings and a valve-seat located therein, of a plunger vertically movable in said pipe and carrying a valve at one end, a slot in the center thereof and a notched upper end, a lever fulcrumed to said pipe carrying a float on one end and having a ball on the other end adapted to fit in the central slot of the plunger, and an auxiliary lever carrying a small float and a cam on its respective ends fulcrumed on top of the pipe, said cam adapted to engage and disengage the notch in the upper end of the plunger, for the purposes described.

In testimony that I claim the foregoing as my own I have hereto affixed my signature in presence of two witnesses.

JOHN F. MILLER.

Witnesses:
JOHN McCRORY,
WM. BRADLEY.